US 6,566,772 B2

(12) United States Patent
Yamaguchi (10) Patent No.: US 6,566,772 B2
(45) Date of Patent: May 20, 2003

(54) AXIAL DIRECTIONAL GAP TYPE ECCENTRIC ROTOR HAVING STOP POSITION MAINTAINING UNIT AND FLAT CORELESS VIBRATION MOTOR USING THE ROTOR

(75) Inventor: Tadao Yamaguchi, Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 10/050,557

(22) Filed: Jan. 18, 2002

(65) Prior Publication Data

US 2002/0093260 A1 Jul. 18, 2002

(30) Foreign Application Priority Data

Jan. 18, 2001 (JP) ........................................ 2001-010028

(51) Int. Cl.[7] ................................................. H02K 7/06
(52) U.S. Cl. ......................................................... 310/81
(58) Field of Search .......................... 310/81, 233, 236, 310/77, 181, 92, 93; H02K 7/075, 7/065

(56) References Cited

U.S. PATENT DOCUMENTS 6,246,143 B1 * 6/2001 Yamaguchi .................. 310/233
6,265,796 B1 * 7/2001 Tezuka ....................... 310/67 R
6,291,915 B1 * 9/2001 Yamaguchi .................. 310/234

FOREIGN PATENT DOCUMENTS

JP          404275046    *  9/1992    .......... H02K/7/075

* cited by examiner

Primary Examiner—Nestor Ramirez
Assistant Examiner—Nguyen Hanh
(74) Attorney, Agent, or Firm—Robert E. Bushnell, Esq.

(57) ABSTRACT

An axial directional gap type eccentric rotor having a stop position maintaining unit includes a commutator in which at least one air-core armature coil is arranged, a arc-shaped protruding portion installed at the outer circumference of the commutator so that at least part thereof faces the outer circumference portion of a donut-shaped magnet at the side of a stator, and an arc-shaped weight having magnetism arranged at least at part of the arc-shaped protruding portion. Thus, cost is lowered by reducing the number of the air-core armature coils. The loss of the main magnetic flux is prevented, without sacrificing a gap, by installing a weight having magnetism at a leakage magnetic flux portion. Also, the eccentric rotor can be moved or stopped at a position where the maximum torque is generated.

25 Claims, 11 Drawing Sheets

AXIAL DIRECTIONAL GAP TYPE ECCENTRIC ROTOR HAVING STOP POSITION MAINTAINING UNIT AND FLAT CORELESS VIBRATION MOTOR USING THE ROTOR

BACKGROUND OF THE INVENTION

1. Field of the Invention

The present invention relates to a flat coreless vibration motor suitable for a vibration source of a small mobile communications apparatus or a massaging apparatus.

2. Description of the Related Art

Figure 13:
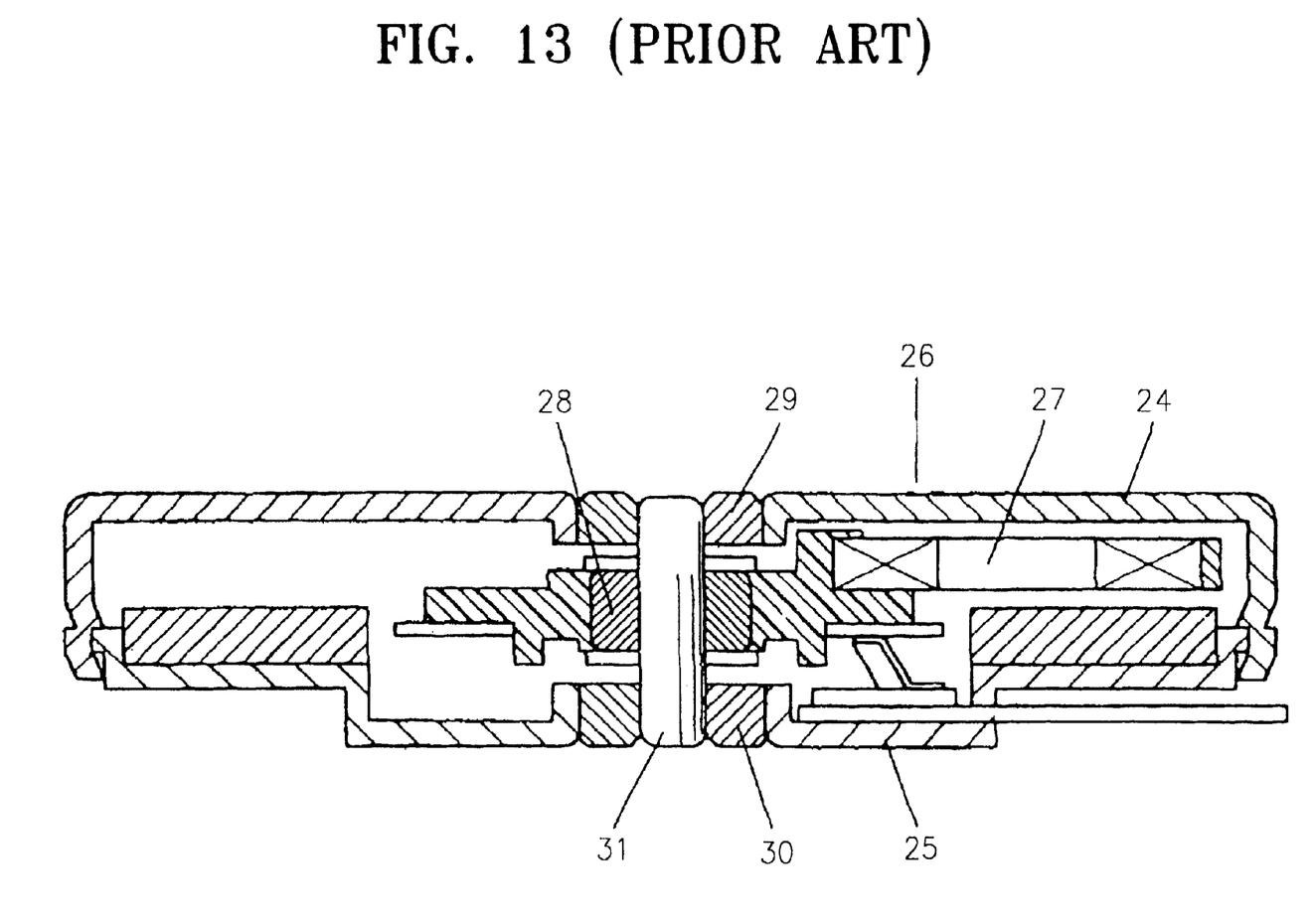
FIG. 13 is a sectional view showing a conventional flat vibration motor.

Conventional flat coreless vibration motors are disclosed in Japanese Patent Publication No. 63-290153 and Japanese Patent Laid-open Publication No. 8-10972. As shown in FIG. 13, in both motors, an eccentric rotor 27 is installed in a housing 26 which is formed of a case 24 and a bracket 25. The eccentric rotor 27 is rotatably supported at a rotary shaft 31 through a rotor holder 28 via oilless bearings 29 and 30 respectively arranged at the case 24 and the bracket 25.

When a plurality of armature coils, for example, three armature coils, are disposed to be eccentric at one side of the rotor, it is advantageous that a great amount of movement of the center of gravity can be produced. However, three coils are disadvantageous in view of a cost. Also, in the motor having three armature coils as disclosed in Japanese Utility Model Publication No. 2-33573, the time during which torque is applied by all coils in the course of one rotation is very short and electricity is always applied to two coils to rotate a rotor.

Also, Japanese Patent Publication No. 2000-201467 discloses a two phase flat vibration motor in which two air-core coils are arranged at an open angle of 135°. However, since only a coil acts as a conductive body contributing torque in the motor having two phase coils, torque is weak during driving and rotation. Also, since the air-core coils make an open angle of 135°, the amount of eccentricity is small. In practice, a weight formed of tungsten alloy needs to be arranged between the two coils.

A rotor having two air-core coils forming an open angle of 120° by removing one air-core coil from a rotor having three air-core coils, is disclosed in Japanese Patent Publication No. 7-85636. This rotor is advantageous in view of cost because a coil is removed. However, torque is not generated evenly according to the angle of rotation during one rotation.

Also, as shown in Japanese Patent No. 3039857, one or two air-core coils are arranged at one side of a rotor so that the rotor can be stopped at a position at which an effective conductive body of each air-core coil contributing torque receives the maximum amount of a magnetic field of a magnet, to remove a driving error.

However, in the rotor stop position maintaining unit, since a magnetic material is arranged in a main magnetic field of a magnet, stop/start torque is large so that a driving voltage of a rotor is increased. Also, since only a part of a main magnetic flux is used, loss of some main magnetic flux occurs. Further, since a magnetic material is arranged between the effective conductive body of a coil and a magnet applying a magnetic force to the effective conductive body of the coil, a gap between the magnet and the coil is widened accordingly so that loss of the main magnetic flux becomes great. In order not to sacrifice the gap, a concave portion is formed by applying pressure to part of an air-core coil and a magnetic material is loaded in the concave portion. In this case, however, the air-core coil may be damaged.

SUMMARY OF THE INVENTION

To solve the above-described problems, it is an object of the present invention to provide an axial directional gap type eccentric rotor in which the number of air-core armature coils is reduced to save cost, a magnetic material is arranged at a leakage magnetic flux portion, not in a main magnetic flux, so that there is no need to widen the axial directional gap in which the main magnetic flux is formed and accordingly there is no loss of the main magnetic flux, the rotor can be surely stopped and rotated at the position for generating the maximum torque, and the amount of eccentricity can be made great without adding an auxiliary eccentricity increasing unit, and a flat coreless vibration motor in which cost can be saved by reducing the size of a magnet by using the eccentric rotor.

To achieve the above object, there is provided an axial directional gap type eccentric rotor having a stop position maintaining unit comprising a commutator in which at least one air-core armature coil is arranged on one side of a central axis, an arc-shaped protruding portion protruding from the outer circumference of the commutator toward a stator so that at least part thereof faces the outer circumference portion of a donut-shaped magnet at the side of the stator, and an arc-shaped weight having magnetism arranged at at least part of the arch-shaped protruding portion.

Here, since the arc-shaped weight having magnetism receives a leakage magnetic flux around the side of the magnet and is surely stopped at the boundary position between the N and S poles of the magnet, for example, the eccentric rotor is held at the position where the maximum torque is generated during rotation. Thus, since the movement of the rotor is easy and the arc-shaped weight is not arranged in the main magnetic flux, loss of gap is not generated. Due to the arc-shaped protruding portion and the arc-shaped weight installed at the outer circumference of the commutator, the center of gravity is moved to the outside of the rotor so that vibration of the rotor can be made great.

It is preferred in the present invention that the arc-shaped weight is installed at the outer circumference of the air-core armature coil, is located at the outer side of the magnet in a radial direction, spans substantially the same open angle as an open angle of a magnetic pole of the magnet, and is arranged to face the side of the magnet through a gap.

Here, since the center portion of the arc-shaped weight can be positioned at a neutral portion between the N and S poles, the rotor can surely held at the position where the maximum torque is generated and movement becomes easy.

It is preferred in the present invention that the arc-shaped weight is formed of metal having a specific gravity of 7 or more and the surface of the arc-shaped weight is plated with magnetic material, and that the arc-shaped weight is formed of resin having a specific gravity of 7 or more and comprising a magnetic metal.

The rotor can be made eccentric by the rotor stop position maintaining means. When a copper wire or braze wire is plated with magnetic material, torque can be controlled by controlling the thickness of a plated film.

It is preferred in the present invention that the commutator is formed of a printed wiring board having a plurality of segments, formed of printed wiring, divided by slits, a protruding portion having no electric pole is formed lengthwise in the slit by printed wiring and indented portions are formed at both sides of the protruding portion.

By providing a concave portion at both sides of the inside of the slit, the neighboring segments on the commutator are prevented from electrically connecting one another by the brush. Also, metal foreign material produced due to brushing does not fall on the segments and not prevent brushing. The commutator and protruding portion are integrally and easily provided as printed wiring.

There is provided an axial directional gap type vibration motor having a stop position maintaining unit, the motor comprising an eccentric rotor comprising a commutator including at least one air-core armature coil is arranged on one side of a central axis, an arc-shaped protruding portion protruding from the outer circumference of the commutator toward a stator so that at least part thereof faces the side of the outer circumference portion of a donut-shaped magnet at the side of the stator, and an arc-shaped weight having magnetism arranged at at least part of the arc-shaped protruding portion, a pair of brushes supplying electricity to the eccentric rotor, the magnet facing the eccentric rotor through an axial directional gap and driving the eccentric rotor by using a magnetic force, and a housing accommodating the eccentric rotor so that the arc-shaped protruding portion is located at a space provided between the outer circumference of the magnet and the housing, wherein the arc-shaped weight receives leakage magnetic flux of the magnet.

Here, since the effective conductive portion of the air-core armature coil can be held at the portions of the magnet where the maximum magnetic flux is generated, without sacrificing the main magnetic flux, movement is made easy and the size of the magnet can be made compact. Thus, a flat type vibration motor can be obtained at a low cost.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
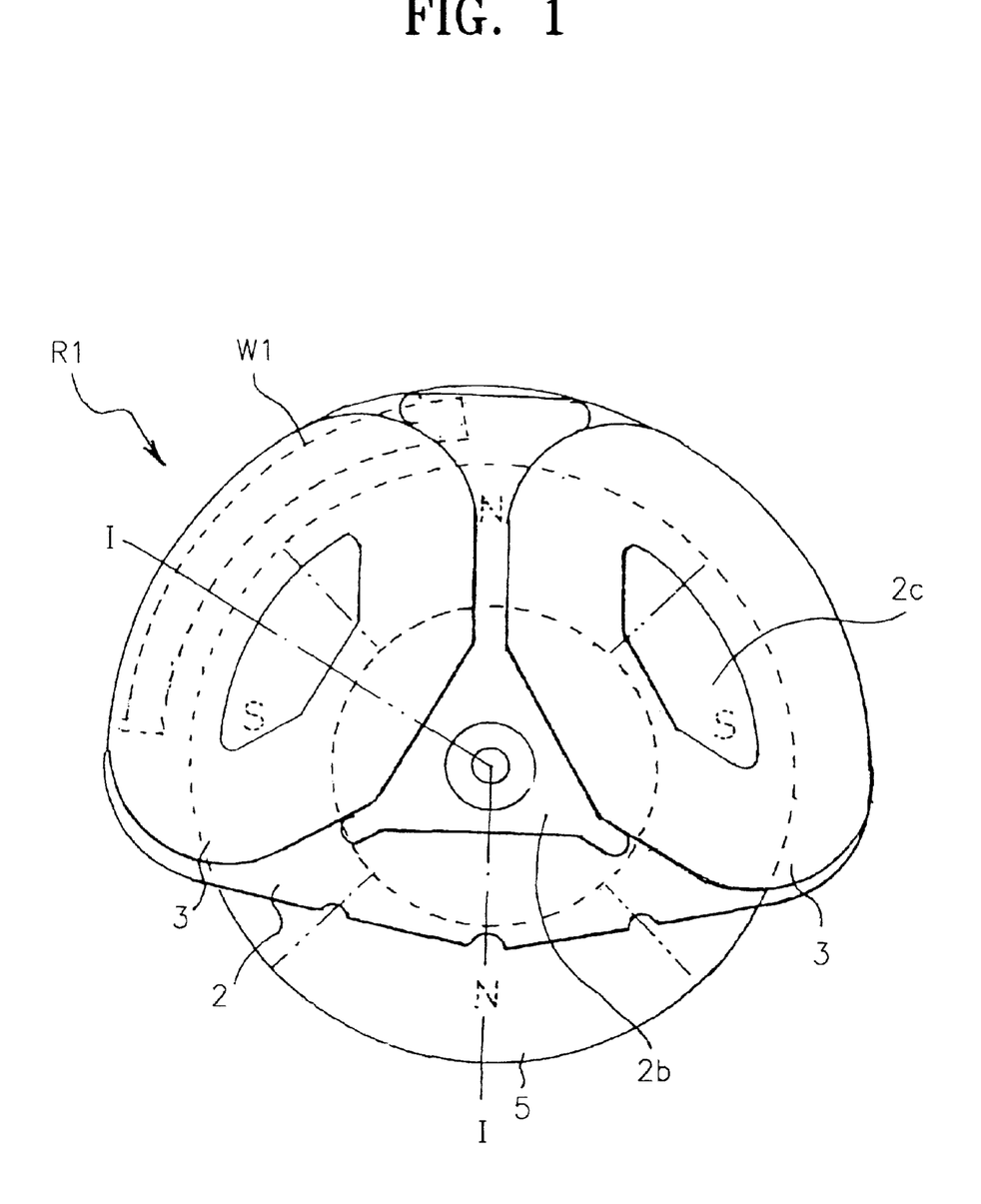
FIG. 1 is a plan view showing the positional relationship between an eccentric rotor having a stop position maintaining unit and a magnet according to a first preferred embodiment of the present invention.
Figure 2:
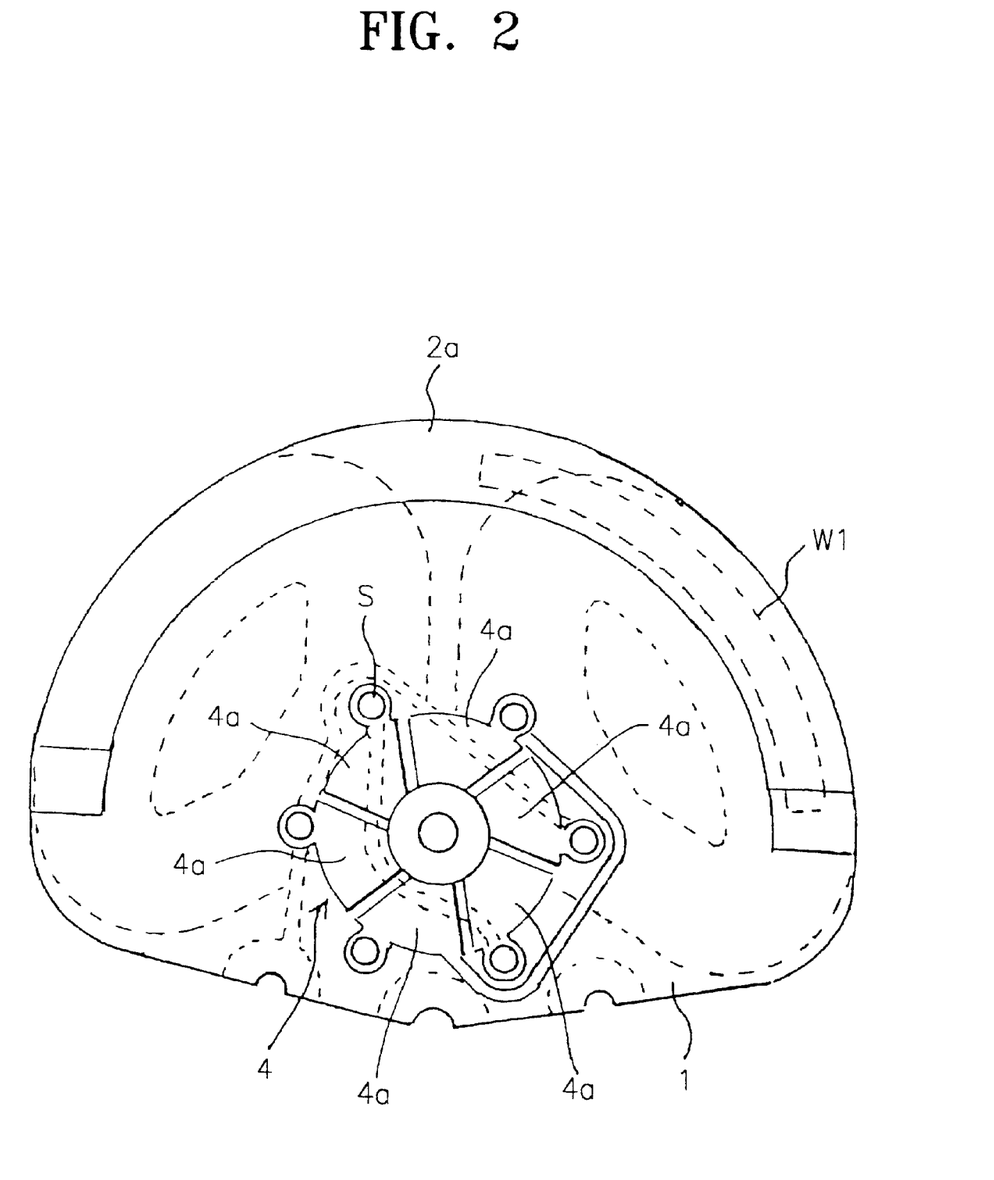
FIG. 2 is a plan view of the eccentric rotor viewed from a commutator of FIG. 1.

Referring to FIGS. 1 and 2, in an eccentric rotor R1 having a stop position maintaining unit according to a first preferred embodiment of the present invention, two air-core coils 3 are arranged at an open angle of 120° (three phases) on a highly slippery resin 2 having a high density, such as a specific gravity of about 3, at one side of a fan-shaped flat commutator base 1 widely spread as a printed wiring board. Also, an arc-shaped weight W1 is integrally formed at an arc-shaped protruding portion 2a through the high density and highly slippery resin 2 at the other side of the commutator base 1. Thus, the arc-shaped protruding portion 2a protrudes from the outer circumference of the commutator base 1 toward the stator in a motor where the eccentric rotor R1 is assembled.

The arc-shaped weight W1 is formed of a material having a specific gravity of 8, plated with magnetic material and installed at the opposite surface of the commutator base 1 corresponding to the outer circumferential portion of the one air-core armature coil 3 at one side of the commutator base 1. The length of the arc-shaped weight W1 is such that it approximately spans an open angle of a magnetic pole with respect to the center of a donut-shaped magnet 5, and therefore depends on the arc-shaped weight W1's distance from the center of the donut-shaped magnet 5. A flat type commutator 4 plated with novel metal formed of six segments 4a with addition of printed wires is provided at the central portion of the flat commutator base 1. Each segment 4a is electrically connected to a corresponding segment through a through hole S.

Reference numeral 2b is a resin bearing portion formed of part of the high density and highly slippery resin 2 and reference numeral 2c is a coil arrangement guide having a size substantially the same as a winding shaft of the air-core armature coils 3 formed of the same resin.

The magnet 5 facing the eccentric rotor R1 has a donut shape, which is magnetized into four equally divided N and S poles.

Thus, as shown in FIG. 1, a leakage magnetic flux generated from the N pole around the side of the magnet 5 to proceed toward the S pole attracts the arc-shaped weight W1 formed of a magnetic plated copper wire toward a boundary portion between the N and S poles. Accordingly, the rotor R1 can be stopped at a position where the air-core armature coils 3 generate the maximum torque in a direction indicated by an arrow Y in FIG. 4, that is, at a position where each of effective conductive body portions 3a of the two air-core armature coils 3 equally receive the maximum magnetic field of the magnet 5.

Here, the arc-shaped weight W1 is preferably a brass wire having a specific gravity of about 7, instead of a copper wire, and may be resin including an appropriate amount of magnetic powder.

Figure 3:
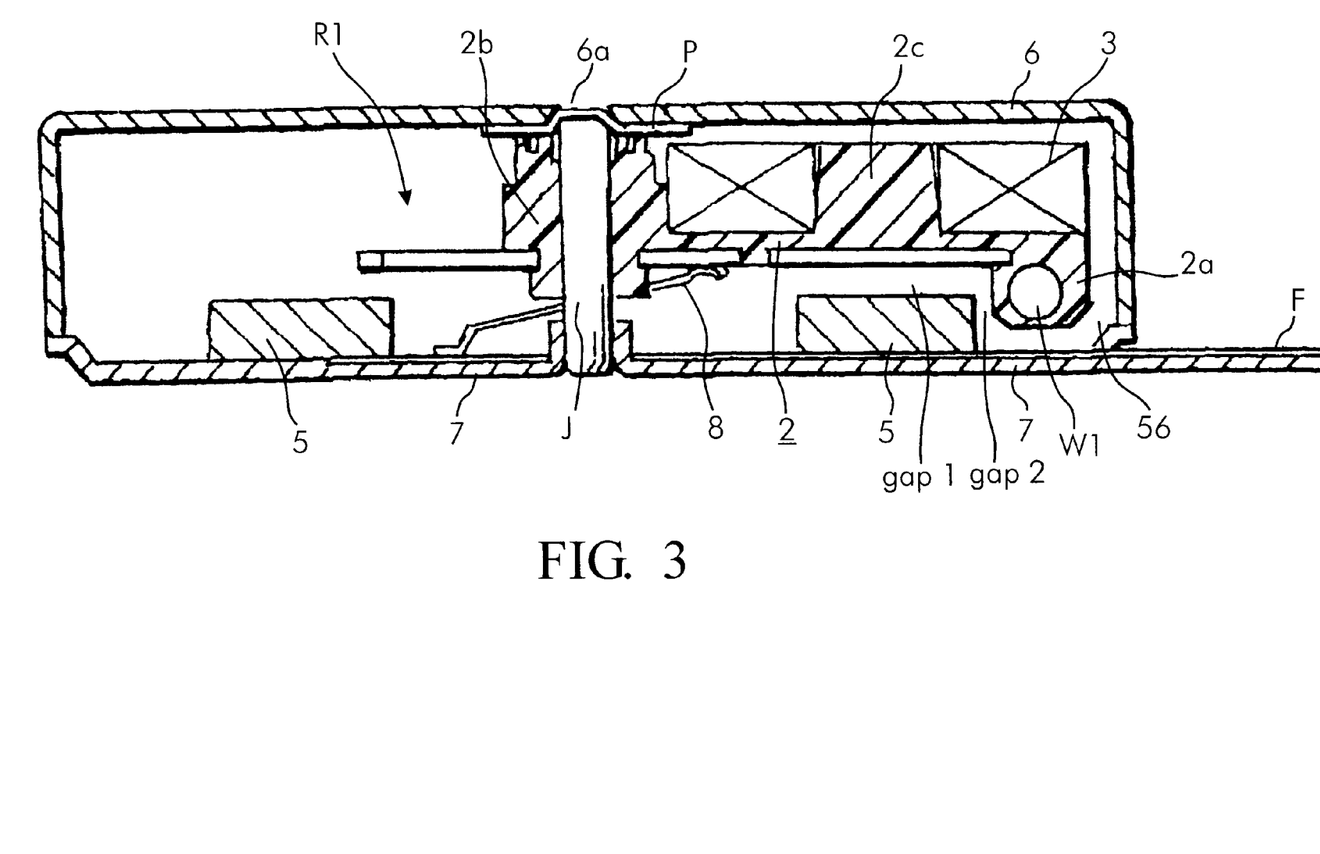
FIG. 3 is a sectional view taken along line I—I of FIG. 1, which shows the eccentric rotor having a stop position maintaining unit adopted in a flat coreless vibration motor according to a first preferred embodiment of the present invention.

The above eccentric rotor R1 is used in a flat coreless vibration motor as shown in FIG. 3. That is, the eccentric rotor R1 is accommodated in a housing H so that the arc-shaped protruding portion 2a is disposed at a space 56 provided between the outer circumference of the magnet 5 and a case 6 forming part of the housing H. Reference letter J denotes a fixed shaft installed at the center of a bracket 7 forming part of the housing H. The fixed shaft J is piled in a center hole 6a of the case 6 through a polyester film P after the eccentric rotor R1 is installed thereon. Reference numeral 8 denotes positive and negative brushes which are a novel metal thin plate or plated with novel metal through which electricity is applied to the air-core armature coils 3 via the flat commutator 4. A base portion of each brush 8 is installed at a flexible electricity supplying base F to receive external electric power. Stator portions include housing H, magnet 5 and bracket 7 on the left side of shaft J in FIG. 3.

Gap 1 in FIG. 3 is a first air gap formed between a top surface of magnet 5 and coil 3. Magnet 5 generates a main magnetic flux in an axial direction (i.e., a direction parallel to shaft J) that interacts with commutator 4, coil 3 and resin rotor base 2. A second gap (Gap 2) in FIG. 3 is a second air gap between an outer surface of magnet 5 and weight (or body) W1 lodged in protrusion 2a of rotor base 2. Magnet 5 generates a leakage flux in a radial direction from the outer surface of magnet 5 that interacts with weight W1 of rotor R1.

Figure 4:
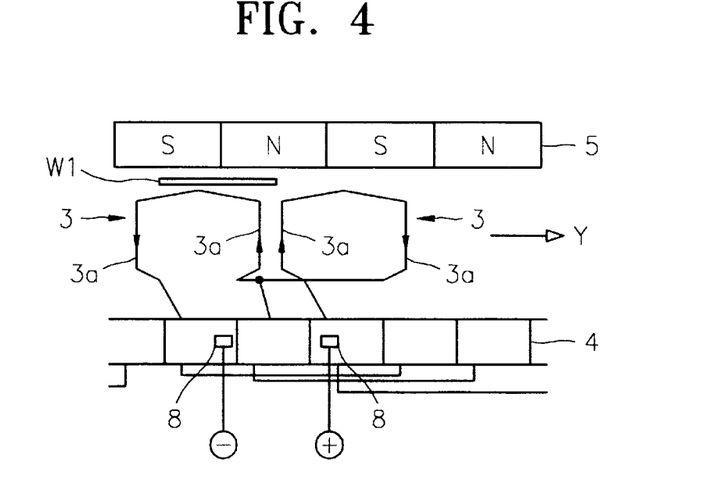
FIG. 4 is a view showing the operation of the motor of FIG. 3 when driven.

In the above flat coreless vibration motor, as shown in FIG. 4, during driving, electric power supplied to the brushes 8 is provided to the air-core armature coils 3 via the flat commutator 4. Current flows through all of the effective conductive body portions 3a as indicated by arrows in FIG. 4. Since a rotational force is generated according to Fleming's left hand rule, the maximum torque can be obtained during the initial stage of driving.

When the supply of electricity to the eccentric rotor R1 stops, rotation is hindered by braking of the brushes 8. Since the flat commutator 4 is equally divided, a braking force due to a contact pressure by the brushes 8 is very weak. Accordingly, by a slight amount of the leakage magnetic flux of the outer circumferential portion of the magnet 5, since the size of the arc-shaped weight W1 is substantially the same as the width of an open angle of a magnetic pole of the donut-shaped magnet 5, the central portion of the arc-shaped weight W1 is disposed at the boundary portion between the magnetic poles of the magnet 5, not the central portion of the magnetic pole, so that the rotor R1 is stopped and then held.

Figure 5:
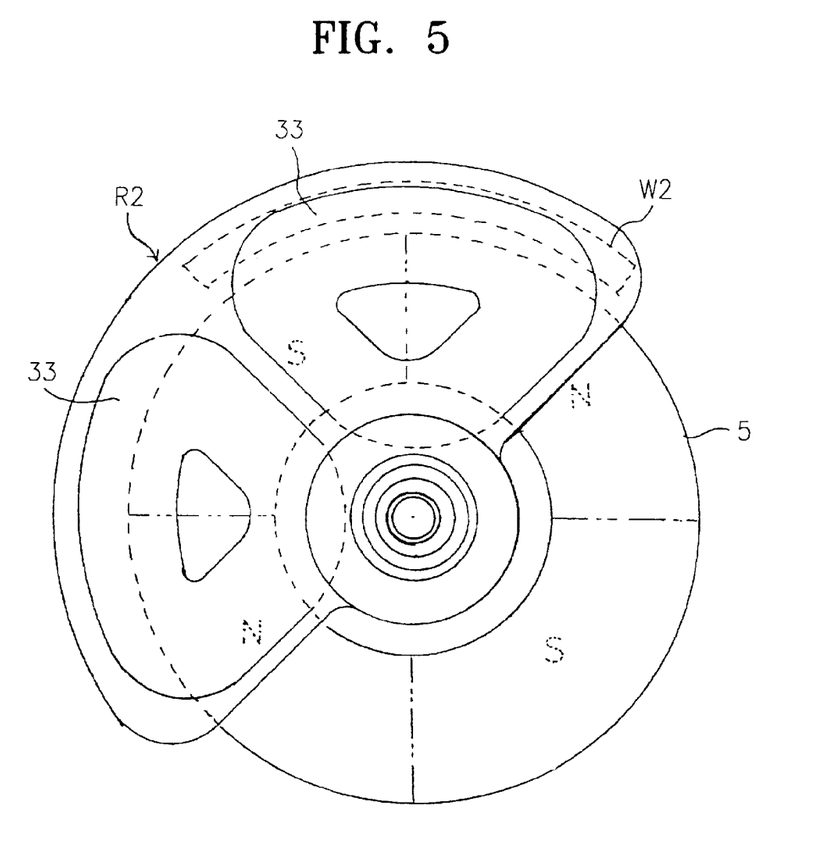
FIG. 5 is a plan view showing the relationship between an eccentric rotor having a stop position maintaining unit and a magnet according to a second preferred embodiment of the present invention.
Figure 6:
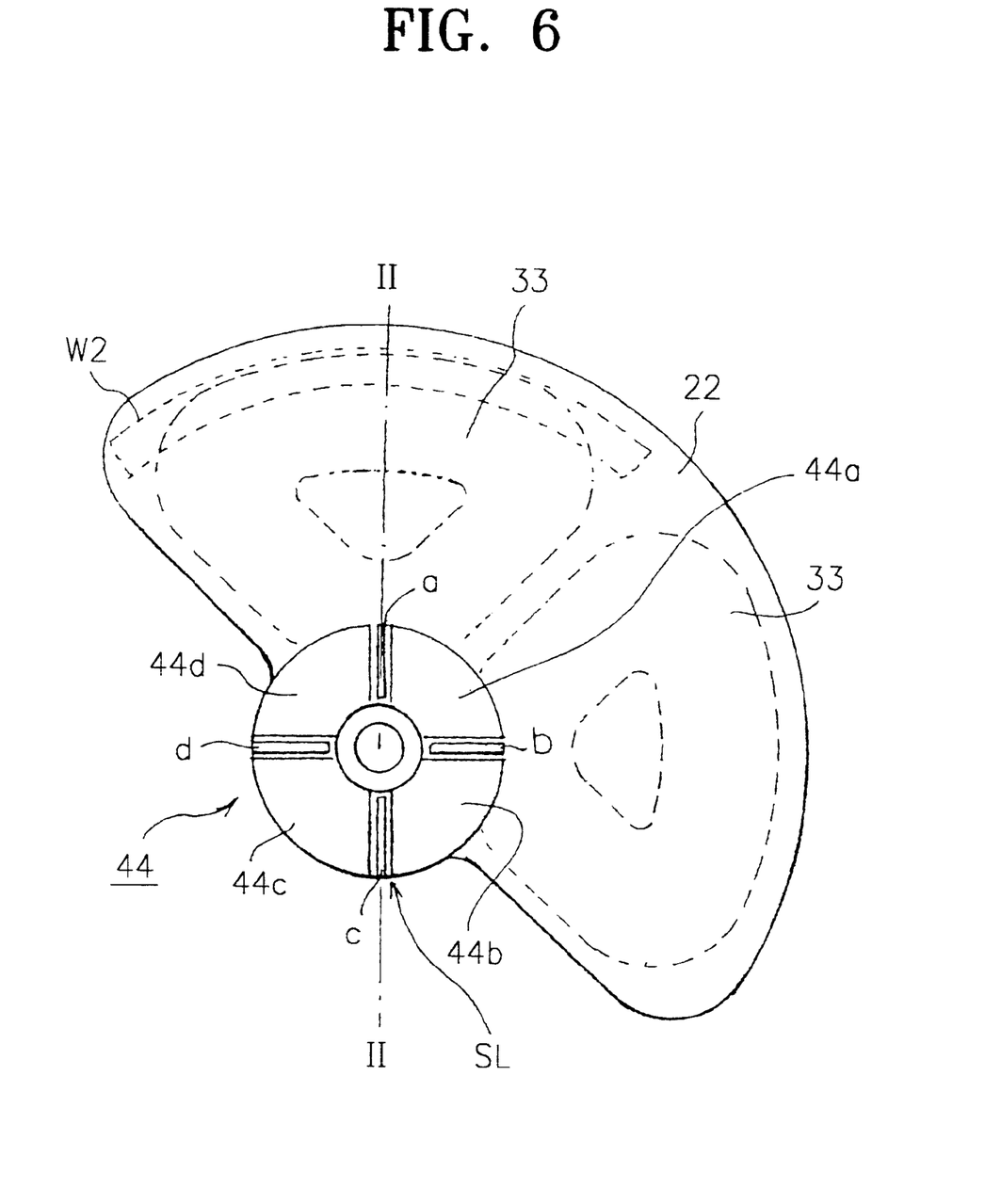
FIG. 6 is a plan view of the eccentric rotor viewed from a commutator of FIG. 5.

FIG. 5 is a plane view showing the relationship between an eccentric rotor R2 having a stop position maintaining unit and a magnet according to a second preferred embodiment of the present invention. FIG. 6 is a plan view of the eccentric rotor viewed from a commutator of FIG. 5. In the eccentric rotor R2 shown in FIG. 5, the size of each coil is less than the width of an open angle of a magnetic pole of a magnet. Two air-core armature coils 33 are unevenly arranged such that their axes of symmetry are perpendicular, i.e., at the same angle spanned by a magnetic pole of the donut shaped magnet. Here, the flat type commutator 44, as shown in FIG. 6, has segments 44a, 44b, 44c, and 44d plated with novel metal in a printed wiring pattern, divided by an angle of 90°. The segments 44a, 44b, 44c, and 44d facing one another to rotate a motor are electrically connected one another. Protruding portions a, b, c, and d in a thin pattern to which no voltage is applied are provided at a slit SL between neighboring segments to prevent short-circuit between the neighboring segments by the brushes 8 (not shown).

Since both sides of each protruding portion have indented portions, when powder of the segments is generated, there is no possibility of short-circuiting between the neighboring segments.

The magnet 5 facing the rotor R2 has a donut shape. The N and S poles are equally divided and magnetized as shown in FIG. 1.

The protruding portions a, b, c, and d prevent short-circuiting between the neighboring segments, for example, 44a and 44b, even when the brushes 8 are located at the slit SL. These protruding portions are of the same level as the surfaces of the segments and have no steps. As the eccentric rotor R2 rotates smoothly, driving of the rotor R2 is facilitated since the rotor R2 can be stopped at a particular position, that is, the position where the effective conductive body portions 33a of the air-core armature coils 33 receives the maximum amount of the magnetic field of the magnet 5 (the same at the other three positions during one rotation), by using an arc-shaped weight W2 formed of the same magnetic material. The arch-shaped weight W2 having magnetism is a resin weight formed by binding magnetic powder with polyamide resin together with powder of a material having a high specific gravity, for example, tungsten alloy.

Figure 7:
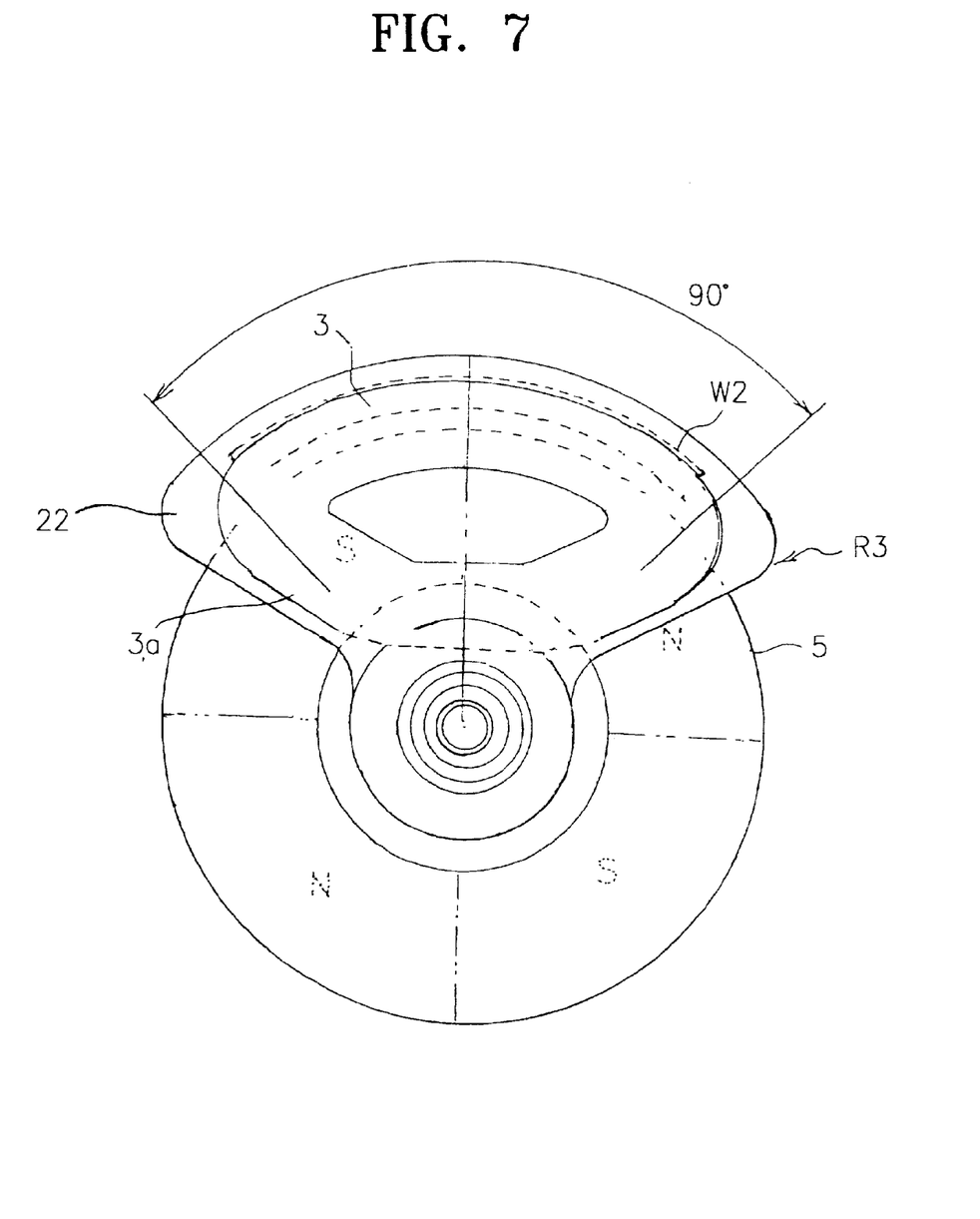
FIG. 7 is a plan view showing the positional relationship between the eccentric rotor and magnet of a modified example of FIG. 5.

Although a two-coil type suitable for a case in which relatively high power is needed is described above, if high power is not needed, a one-coil type as shown in FIG. 7 will suffice. In the eccentric rotor R3 shown in FIG. 7, one air-core armature coil 3 is integrally formed with a high density and highly slippery resin 22 and arranged at one side. The air-core armature coil 3 is the same as the armature coil shown in FIG. 1 and is wound around a shaft forming an open angle of 120° like the air-core armature coil shown in FIG. 1 such that the open angle of the effective conductive body portion 3a of the air-core armature coil 3 can be almost the same as the open angle (here, 90°) of the magnetic pole. An arc-shaped protruding portion 22a formed of the high density and highly slippery resin 22 is provided at the outer circumferential portion and at the underside of the air-core armature coil 3 of the commutator, through a flat commutator base 1 formed as a printed wiring board. Here, the integrally formed arc-shaped weight W1 or W2 is the same as the arc-shaped weight W1 in FIG. 1. The magnet 5 has a donut shape as described above and the N and S poles are equally divided and magnetized. Here, the open angle of the arc-shaped weight W1 or W2 formed of a magnetic material is almost the same as the open angle of the magnetic pole of the magnet 5. Thus, the center of the air-core armature coil 3 and the arc-shaped weight W1 or W2 are stopped at an intermediate position between the N and S poles every 90° during rotation.

Figure 8:
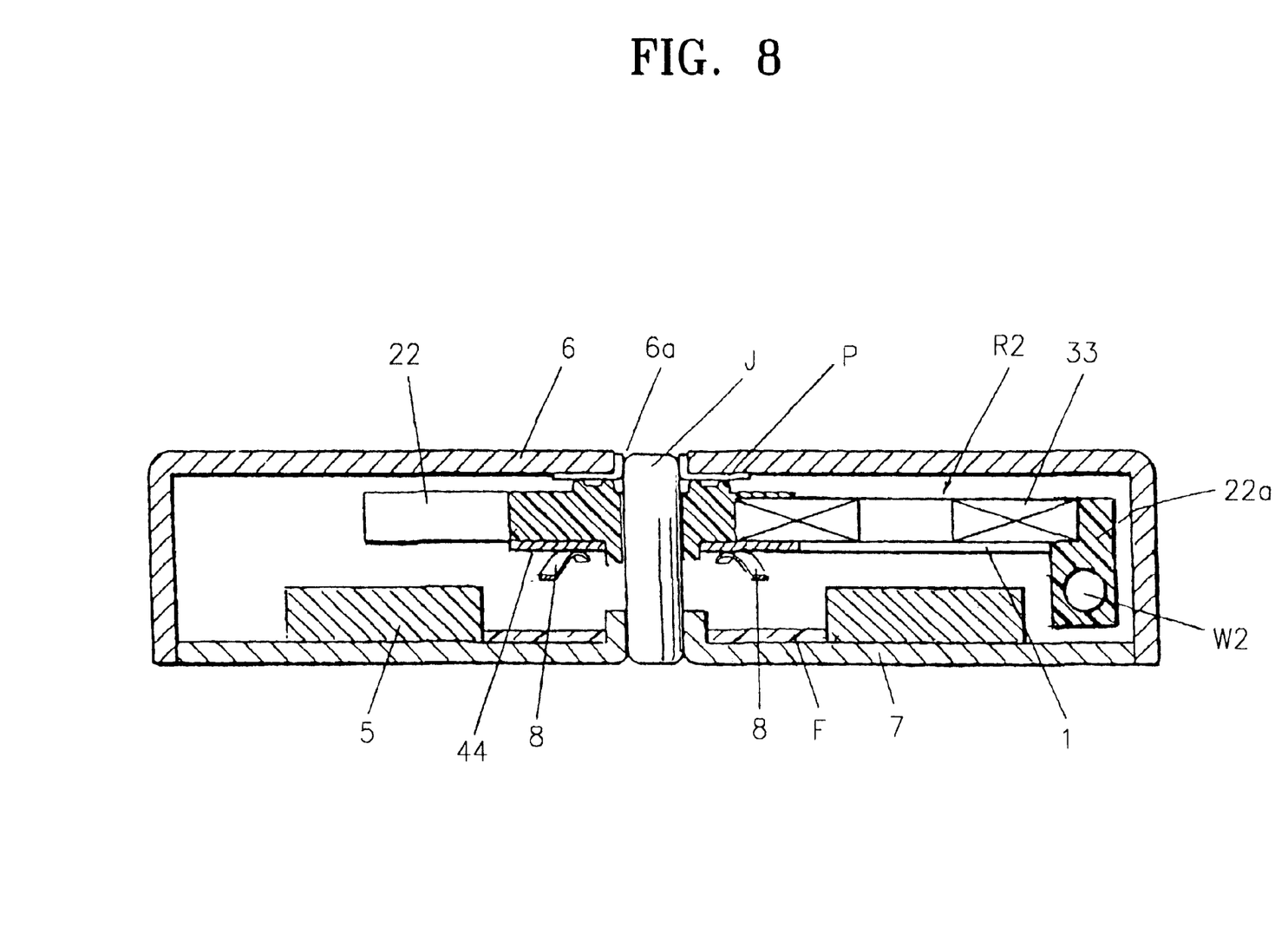
FIG. 8 is a sectional view taken along line II—II of FIG. 6 which shows the eccentric rotor having a stop position maintaining unit adopted in a flat coreless vibration motor according to a second preferred embodiment of the present invention.

FIG. 8 is a cross-section of a flat coreless vibration motor using the eccentric rotor R2 according to the second preferred embodiment of the present invention, taken along line II—II of FIG. 6. Here, the same members as those shown in FIG. 4 are indicated by the same reference numerals and descriptions thereof will be omitted.

Figure 9:
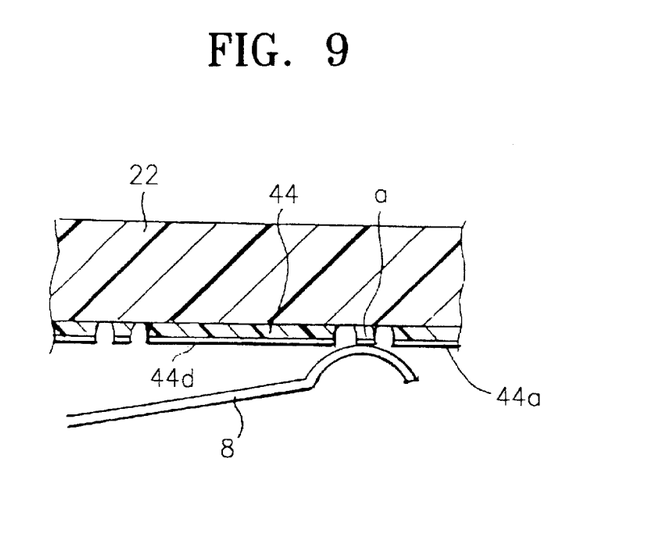
FIG. 9 is a magnified sectional view showing the relationship between a flat commutator and a brush which are major members of the motor of FIG. 8.

Here, the state of the brushes 8 brushing the flat commutator 44 is shown in FIG. 9. That is, in the portion of the flat commutator 44 that the brushes 8 brush, there is no concern about short-circuiting of the neighboring segments, for example, the segments 44a and 44d, by the protruding portion a.

Figure 10:
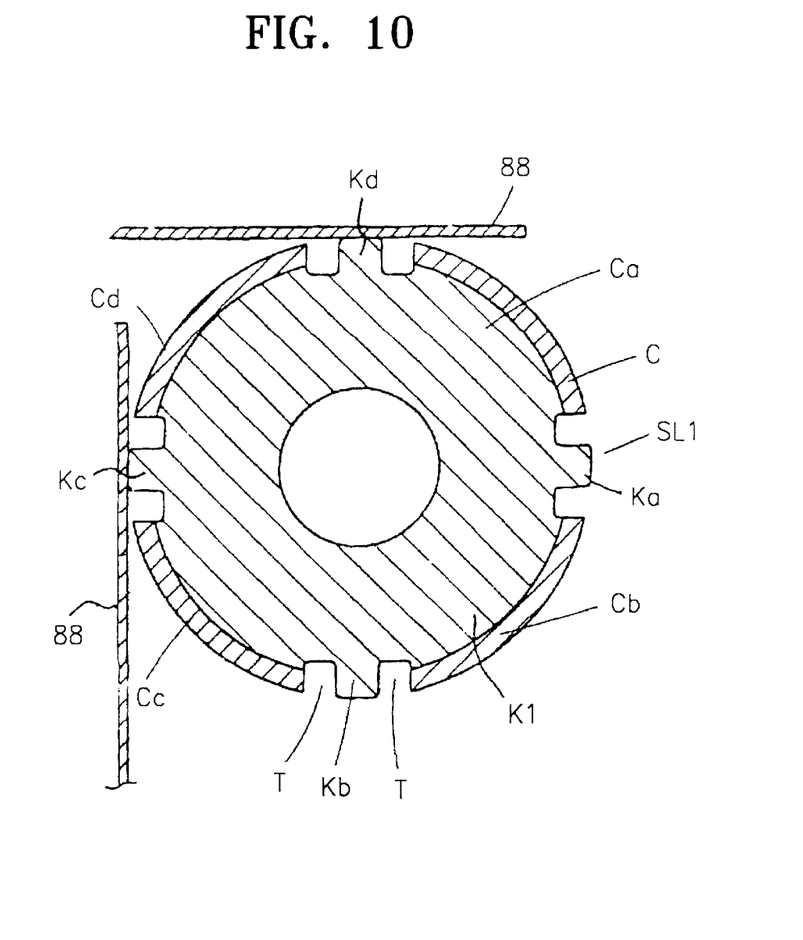
FIG. 10 is a magnified sectional view showing a cylindrical commutator and a brush which are modified examples of the major members of the motor of the present invention.

FIG. 10 shows a cylindrical commutator and a brush which are modified examples of the major members of the motor of the present invention. Here, reference numeral 88 denotes a pair of leaf brushes which are novel metal thin plate or plated with novel metal. Reference letter C denotes a cylindrical commutator having segments Ca Cb, Cc, and Cd equally divided by 90° at the outer circumference of the cylindrical commutator. The segments Ca, Cb, Cc, and Cd are clad with novel metal. Protruding portions Ka, Kb, Kc, and Kd having indented portions T at both sides thereof are formed at a slit SL1 between segments such that the tip portion thereof is the substantially same circle as the circumference of the segments at a base portion K1 in order to prevent short-circuiting by brushes 88.

The cylindrical commutator is used when the thickness of a motor allows it.

Figure 11A:
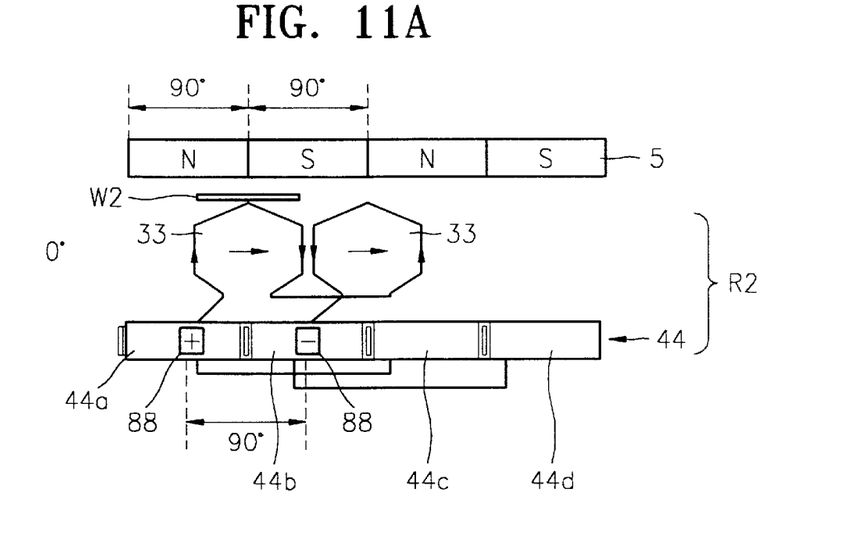
FIGS. 11A through 11C are views showing the principle of rotation of the motor of FIG. 8 by using the eccentric rotor of FIGS. 5 and 6.
Figure 11B:
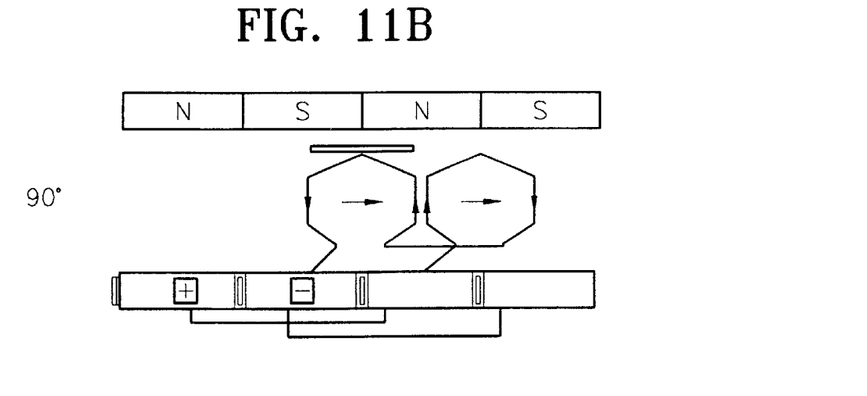
Figure 11C:
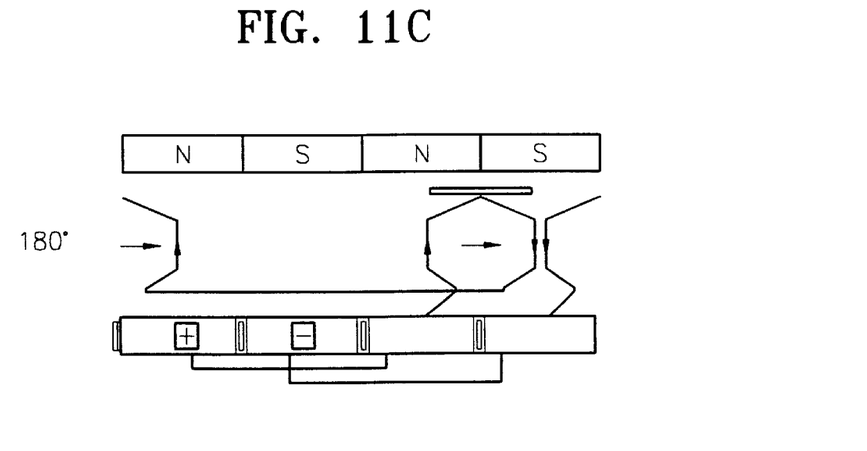

FIG. 11 shows the rotation principle of the flat coreless vibration motor shown in FIG. 8. As to a matter of wire connection, wiring end portions of the air-core armature coils 33 of the eccentric rotor R2 are connected together while wiring start portions of the air-core armature coils 33 are respectively connected to the segments 44a and 44b of the commutator 44. In the commutator 44, the segments 44a and 44c, and the segments 44b and 44d facing each other are electrically connected to be at the same electric potential.

As shown in FIG. 5, the eccentric rotor R2 is stopped at the boundary portion between the magnetic poles of the magnet 5 by the arc-shaped weight W2 formed of the magnetic material. When electricity is supplied in this state, current flows in each air-core armature coil 33 in a direction indicated by the arrow through the pair of brushes 88. Then, the eccentric rotor R2 is rotated as a rotational force is generated in the direction to the right/left as shown in FIG. 11A according to Fleming's left hand rule.

When the commutator 44 and the eccentric rotor R2 rotate by 90° to be at the position shown in FIG. 11B, current flows in each air-core armature coil 33 in the opposite direction. However, since the pole of the magnet facing these coils changes, a rotational force in the direction to the right/left is generated so that rotation continues. Then, rotation of the commutator 44 and the eccentric rotor R2 further continues by 90° and is located at the position of 180° shown in FIG. 11C. Although the position is different, the eccentric rotor R2 takes the same action as in FIG. 11A.

As can be seen in FIGS. 11A through 11C, the brushes 88 are positioned on the protruding portions at the slit SL1 of the commutator 44 at every 45° and are not electrically connected with the segments. However, since the eccentric rotor R2 is not stopped at the protruding portions of the slit SL1 due to inertia of the rotor during rotation and due to the arc-shaped weight W2 formed of the magnetic material during non electric connection, there is no problem.

Also, the shape or size of each coil does not need to be identical and the open angle of each segment of the commutator 44 or the open angle of the brushes 88 does not need to be exactly 90°. Although the eccentric rotor R2 has the one air-core armature coil 3 as shown in FIG. 7, the principle of rotation is the same as that shown in FIGS. 12A, 12B, and 12C.

Figure 12A:
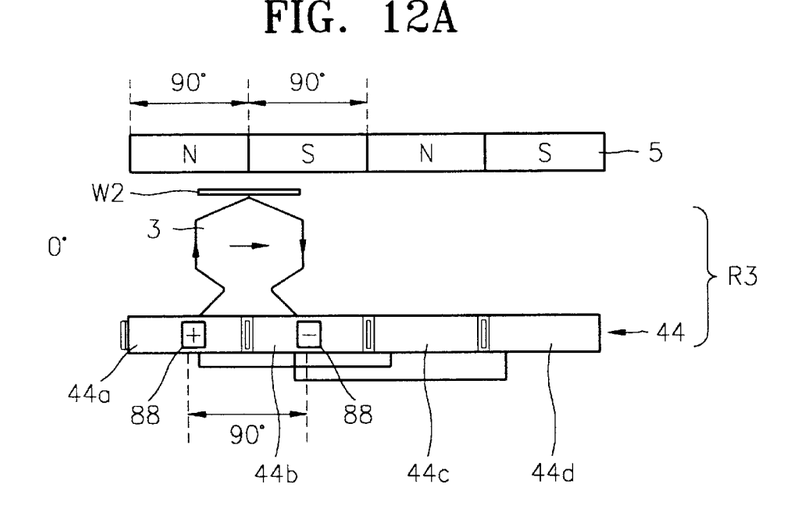
FIGS. 12A through 12C are views showing the principle of rotation when the eccentric rotor of FIG. 7 is used.

Before describing the rotation principle of the vibration motor, connection of wires will be first described. The winding start terminal and winding end terminal of the air-core armature coil 3 of the eccentric rotor R3 are connected to the segments 44a and 44b of the commutator 44, respectively. The commutator 44 is formed such that segments 44a and 44c and the segments 44b and 44d facing one another are electrically connected to be at the same electric potential.

The eccentric rotor R3 is stopped at the boundary position between the magnetic poles of the magnet 5 shown in FIG. 7 by the arc-shaped weight W2 formed of the magnetic material. When electricity is applied in this state, current flows to the air-core armature coil 3 through the brushes 88 in the direction indicated by the arrows. Then, a rotational force is generated in the direction to the right/left according to Fleming's left hand rule in FIG. 12A so that the eccentric rotor R3 rotates. When the commutator 44 and the eccentric rotor R3 rotate by 90° to be at the position shown in FIG. 11B, current flows in the air-core armature coil 33 in the reverse direction. Since the polarity of the magnet facing these coils is changed, a rotational force in the direction to the right/left is generated according to Fleming's left hand rule so that the rotation continues. Then, when the commutator 44 and the eccentric rotor R2 rotate further by 90° to be at the position of 180° of FIG. 12C, the eccentric rotor R3 takes the same action as in FIG. 12A.

Figure 12B:
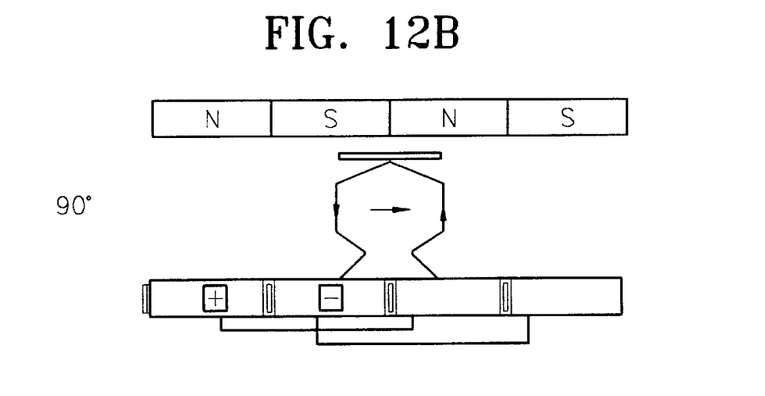
Figure 12C:
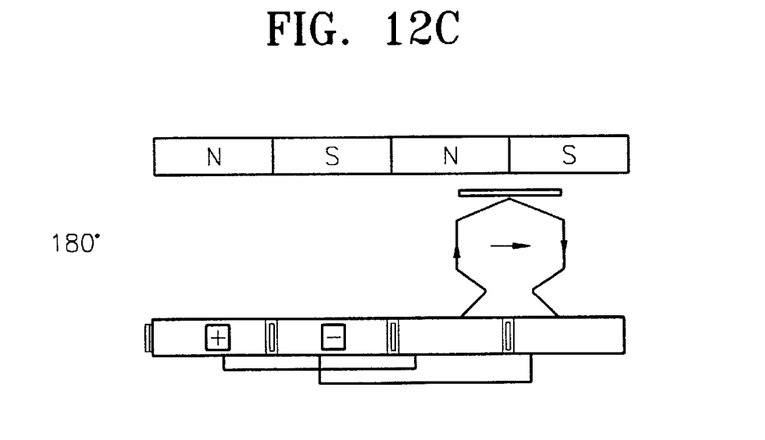

As can be seen from FIGS. 12A, 12B and 12C, the brushes 88 are positioned on the protruding portions at the slit SL1 of the commutator 44 at every 45° and are not electrically connected with the segments. However, the eccentric rotor R2 is not stopped at the slit portion due to inertia of the rotor and the leakage magnetic flux of the magnet the arc-shaped weight W2 formed of the magnetic material during rotation without supplying electricity to the brush 33.

The arc-shaped weight W2 in which at least the surface thereof is processed with the magnetic material is a copper wire plated with magnetic material. If the magnet is a strong neodymyum sintered magnet having a diameter of about 9 mm, a thin steel wire having a diameter of about 0.3 mm having a specific gravity of about 7 may be used. In this case, to increase the amount of eccentricity, the weight of the weight can be preferably increased by forming the arc-shaped protruding portion to be integrated with the weight by using resin having a high specific gravity of 6 through 10.

Also, although in the above embodiments all air-core armature coils are formed not to overlap each other, the air-core armature coils can be made thin and overlap in two or more layers.

While this invention has been particularly shown and described with reference to preferred embodiments thereof, it will be understood by those skilled in the art that various changes in form and details may be made therein without departing from the spirit and scope of the invention as defined by the appended claims.

As described above, in the eccentric rotor according to the present invention, the air-core armature coil is reduced to save cost, a weight formed of a magnetic material is arranged at the leakage magnetic flux portion without sacrificing a gap, and loss of the main magnetic flux is avoided. Also, the eccentric rotor can be moved or stopped at a position where the maximum torque is generated.

Also, a rotor having a great amount of eccentricity without adding an auxiliary eccentricity increasing unit can be obtained. A flat coreless vibration motor using the eccentric rotor to reduce the size of the magnet, save cost, and increase vibrations can be obtained.

In detail, since the weight having magnetism is accurately stopped at a boundary portion between the N and S poles by receiving the leakage magnetic flux around the side surface of the magnet, the eccentric rotor can be stopped at a position where the maximum torque can generated. Thus, the eccentric rotor can be easily driven. Since the weight is not arranged in the main magnetic flux, loss of the main magnetic flux does not occur. Since the center of the weight of the eccentric rotor position is located at the outer side due to the arc-shaped protruding portion installed at the outer circumference, greater vibration is generated.

Also, the air-core armature coil can be securely held at the position where the maximum torque can be generated. When a copper wire is plated with magnetic material, torque for movement can be controlled by adjusting the thickness of plating. Since magnetic powder, for example, one bound with polyamide resin, is used, molding is made easy. The commutator and the protruding portions are easily formed by using a well-known etching technology so that neighboring segments of the commutator cannot be electrically connected. Since the effective conductive portion of the air-core armature coil can be stopped at the position where the maximum magnetic flux is generated, without sacrificing the main magnetic flux, the eccentric rotor can be easily driven and the size of the magnet can be reduced, which is advantageous in view of cost.

What is claimed is:

1. An axial directional gap type eccentric rotor having a stop position maintaining unit, the rotor being exposed to magnetic flux generated by a disk-shaped magnet, said rotor comprising:

a commutator comprising a shaft support at a center thereof and an air-core armature coil disposed to be eccentric on one side thereof;

an arc-shaped protruding portion protruding from an outer circumference of the commutator, said arc-shaped protruding portion being disposed adjacent to said armature coil and being further away from said shaft support than said armature coil so that part of an outer circumference portion of said magnet having a main magnetic flux in an axial direction and part of the arc-shaped protruding portion are disposed to face each other through a gap having leakage magnetic flux; and an arc-shaped body comprised of magnetic material and disposed in part of said arc-shaped protruding portion.

2. The rotor of claim 1, wherein said arc-shaped body spans substantially the same open angle as an open angle of a magnetic pole of the magnet.

3. The rotor of claim 1, wherein the arc-shaped body comprises metal having a specific gravity of 7 or more and the surface of the arc-shaped body comprises magnetic material.

4. The rotor of claim 1, wherein the arc-shaped body comprising resin having a specific gravity of 7 or more and comprising a magnetic metal.

5. The rotor of claim 1, wherein the commutator is formed of a printed wiring board having a plurality of segments comprised of printed wiring divided by slits, a protruding portion having no electric pole is formed lengthwise in the slit by printed wiring and indented portions are formed at both sides of the protruding portion.

6. An axial directional gap type vibration motor having a stop position maintaining unit, the motor comprising:

an eccentric rotor comprising a commutator comprising a shaft support portion at a center thereof and an air-core armature coil disposed to be eccentric on one side thereof and an arc-shaped protruding portion protruding from an outer circumference of the commutator, said arc-shaped protruding portion being disposed adjacent to said armature coil and being further away from said shaft support portion than said armature coil so that part of an outer circumference portion of a gap type magnet having a main magnetic flux in an axial direction and part of the arc-shaped protruding portion are disposed to face each other through a gap having leakage magnetic flux said eccentric rotor further comprising an arc-shaped body having magnetism and being disposed in at least part of said arc-shaped protruding portion;

a pair of brushes supplying electricity to the eccentric rotor; and a housing accommodating the eccentric rotor so that the arc-shaped protruding portion is located at a space provided between the outer circumference of the magnet and the housing, the arc-shaped body receives leakage magnetic flux of the magnet.

7. The motor of claim 6, wherein the commutator comprises a printed wiring board having a plurality of segments comprised of printed wiring and divided by slits, said commutator further comprises a protruding portion having no electric pole being disposed lengthwise in each of said slits by printed wiring, said commutator further comprising indented portions formed at both sides of each protruding portion.

8. An axial direction gap type vibration motor, comprising:

a stationary ring-shaped magnet having a main magnetic flux emanating in an axial direction above and below said ring-shaped magnet and having leakage magnetic flux emanating in a radial direction outward from an outer circumferential surface of said ring-shaped magnet;

a rotatable eccentric rotor, comprising:
a commutator,
an air-core armature coil facing said ring-shaped magnet through an axial direction gap,
an arc-shaped protruding portion extending from the commutator so that the arc-shaped protruding portion faces an outer circumference of the magnet through a radial gap, and
an arc-shaped weight comprised of magnetic material disposed in said arc-shaped protruding portion and facing said outer circumferential surface of said ring-shaped magnet; and a pair of brushes supplying electricity to said eccentric rotor.

9. The motor of claim 8, said weight spanning an angle essentially the same as an open angle of a magnetic pole of said magnet.

10. The motor of claim 8, said weight having a specific gravity of at least 7.

11. The motor of claim 8, said rotor stopping when a center of said weight is disposed at a border between two magnetic poles of said ring-shaped magnet.

12. The motor of claim 8, said brushes being a pair of leaf brushes and said commutator being a cylindrical commutator having 4 segments of approximately 90 degrees each.

13. The motor of claim 12, each of said 4 segments are electrically separated from each other by a slit having a protruding portion and a pair of indented portions surrounding said protruding portion.

14. The motor of claim 8, said weight being exposed to only said leakage flux from said ring-shaped magnet and said weight being absent from exposure to main magnetic flux of said ring-shaped magnet.

15. The motor of claim 8, said rotor being stopped at a position for generating maximum torque.

16. The motor of claim 8, said weight being plated with a magnetic material so that torque can be controlled by the thickness of said plated magnetic material.

17. A vibration motor, comprising:
   a disk-shaped magnet having an inner surface, an outer surface, a top surface and a bottom surface;
   a rotor base disposed above said magnet, said rotor base comprising:
      a bearing portion, said bearing portion being perforated by a hole accommodating a stationary shaft,
      a coil arrangement guide, and
      an arc-shaped protruding portion, said coil arrangement guide and said arc-shaped protruding portion being eccentric about said bearing portion, said arc-shaped protruding portion being further from said bearing portion than said coil arrangement guide;
   an air-core armature coil disposed about said coil arrangement guide;
   an arc-shaped body disposed inside said arc-shaped protruding portion;
   a commutator disposed on said rotor base, said commutator being electrically connected to said coil via brushes; and
   a housing surrounding said rotor base, said disk-shaped magnet, said coil, said commutator and said arc-shaped body, said arc-shaped body comprising magnetic material and facing said outer surface of said disk-shaped magnet in a radial direction from said outer surface of said disk-shaped magnet with respect to said shaft through a second air gap, said coil facing said disk-shaped magnet in a direction parallel to said shaft through a first air gap.

18. The motor of claim 17, said disk-shaped magnet alternating poles every quarter of a circumference of said disk-shaped magnet, said coil and said body spanning one-quarter of said circumference of said disk-shaped magnet.

19. The motor of claim 17, said body having a specific gravity of at least 7, said rotor base being comprised of a slippery, homogenous resin material.

20. The motor of claim 17, said coil being exposed to a first magnetic flux from said top surface of said disk-shaped magnet, said first magnetic flux being essentially in a direction parallel to said shaft, said arc-shaped body being exposed to a second magnetic flux emanating from said outer surface of said disk-shaped magnet, said second magnetic flux being essentially in a radial direction with respect to said shaft.

21. A vibration motor, comprising:
   a disk-shaped magnet having a top surface, a bottom surface, an inner circumferential surface and an outer circumferential surface, said disk-shaped magnet having alternating polarity around a circumference of said disk-shaped magnet, said inner and outer circumferential surfaces of said disk-shaped magnet being disposed about an axial shaft, said disk-shaped magnet having a first magnetic flux emanating from said top and said bottom surfaces in a direction parallel to said axial shaft, said disk-shaped magnet having a second magnetic flux emanating from said outer circumferential surface of said disk-shaped magnet in a radial direction away from said axial shaft; and
   an eccentric rotor disposed about said axial shaft, said eccentric rotor comprising:
      a guide to accommodate a coil, said coil being exposed to said first magnetic flux from said disk-shaped magnet, and
      an arc-shaped protruding portion extending further away from said axial shaft than said outer circumferential surface of said disk-shaped magnet, said arc-shaped protruding portion being comprised of a magnetic material, said arc-shaped protruding portion being exposed to said second magnetic flux emanating from said disk-shaped magnet.

22. The motor of claim 21, said disk-shaped magnet being stationary while said eccentric rotor being capable of being rotated about said axial shaft.

23. The motor of claim 21, said arc-shaped weight having a specific gravity of at least 7 and being made of a material that is different than a material that makes up other parts of said eccentric rotor.

24. The motor of claim 21, said coil being separated from said top surface of said disk-shaped magnet by a first air gap, said arc-shaped weight being separated from said outer surface of said disk-shaped weight by a second air gap.

25. The motor of claim 21, said inner circumferential surface of said disk-shaped magnet, said outer circumferential surface of said disk-shaped magnet and said arc-shaped weight tracing out concentric circles centered about said axial shaft.

* * * * *